United States Patent

Konno

[11] Patent Number: 5,962,042
[45] Date of Patent: Oct. 5, 1999

[54] INJECTION MOLD

[75] Inventor: Kanao Konno, Narashino, Japan

[73] Assignee: Sakura Plastic Co., Ltd., Funabashi, Japan

[21] Appl. No.: 08/902,629

[22] Filed: Jul. 29, 1997

[30] Foreign Application Priority Data

Aug. 27, 1996 [JP] Japan ..................................... 8-225218

[51] Int. Cl.$^6$ ................................................. B29C 45/38
[52] U.S. Cl. ....................................... 425/542; 264/328.9
[58] Field of Search ......................... 425/542; 264/328.9

[56] References Cited

PUBLICATIONS

Mold–Making Handbook For the Plastics Engineer, pp. 35–38, 1983.

*Primary Examiner*—Tim Heitbrink
*Attorney, Agent, or Firm*—Pollock, Vande Sande & Amernick, R.L.L.P.

[57] ABSTRACT

An injection mold is disclosed which includes cavities, resin passages for feeding resin toward the cavities and gates for injecting resin fed through the resin passages into the cavities. The gates each are arranged in a manner to be deviated from each of the cavities, so that only a part of an opening of the gate at an end of the gate facing the cavity is open to the cavity. Such construction, when tensile force is applied between a molded article and an in-the-gate molded resin portion to release the molded article from the mold, facilitates separation therebetween while keeping the in-the-gate molded resin portion from being left on a side of the molded article.

4 Claims, 8 Drawing Sheets

INJECTION MOLD

BACKGROUND OF THE INVENTION

This invention relates to an injection mold, and more particularly to an injection mold for molding synthetic resin by injection molding.

In general, an injection mold used for an injection molding machine includes a mold body constituted by a first template and a second template joined to each other in a manner to be separable from each other. The mold body is formed therein with a cavity (a space in which molten resin is to be filled) of a configuration corresponding to that of an article to be molded, a resin flow passage through which molten resin is flowed therethrough toward the cavity, and a gate through which the molten resin flowed through the resin flow passage is injected into the cavity. At least one of the first and second templates is supported in a manner to be displaceable in a direction perpendicular to a parting face or line therebetween, so that relative displacement between the first template and the second template permits the mold body to be openably operated.

When molding is to be carried out, the first and second templates are abutted on an end surface thereof defined along the parting line against each other and then clamped together using any suitable clamping mechanism to close the mold body. Then, molten resin is injected through the gate into the cavity, resulting in being molded into an molded article. After the molding, the first and second templates are displaced in a direction in which they are separated from each other, so that the molded article may be removed from the mold body.

Now, the mold body of the conventional injection mold will be more detailedly described with reference to FIG. 11, which shows an essential part thereof. A mold body which is generally designated at reference numeral 1 in FIG. 11 is constructed so as to be slit or separated into first and second templates 2 and 3 along a parting line PL. The first and second templates 2 and 3 have end surfaces 2a and 3a defined along the parting line PL, respectively. When molding is to be carried out, the first and second templates 2 and 3 are joined to each other while keeping the end surfaces 2a and 3a abutted against each other. In the mold body 1 shown in FIG. 11, the first template 2 is formed therein with a cavity formation section 4a constituting a part of a cavity 4 and a sprue 6 for receiving therein molten resin 5 injected from a nozzle of an injection molding machine. The second template 3 is formed therein with a cavity formation section 4b constituting the remaining part of the cavity 4, a runner 7 through which molten resin introduced into the sprue 6 is guided along the parting line PL toward the cavity 4, and a gate 8 through which molten resin fed through the runner 7 is injected through a side surface of the cavity 4 into the cavity 4. In the mold body 1 shown in FIG. 11, the sprue 6 and runner 7 cooperate together to provide a resin flow passage through which molten resin is flowed toward the cavity 4.

The gate 8 arranged so as to inject resin from the side surface of cavity 4 along the parting line PL into the cavity 4 as described above is generally called a submarine gate or a tunnel gate.

The mold body shown in FIG. 11 is provided therein with an additional cavity on a right-hand side of the sprue 5 in order to concurrently produce a plurality of molded articles or moldings. For this purpose, an additional runner 7 for feeding resin to the additional cavity is connected to the sprue 6.

In the mold body thus constructed, the second template 3 is actuated by a pneumatic cylinder or the like, to thereby be displaced between a closed position at which the second template 3 is kept abutted or matched against the first template 2 as shown in FIG. 11 and an open position at which the former is kept separated from the latter. When molding takes place, the second template 3 is positioned at the closed position and tightly fastened to the first temperate 2 to a degree sufficient to withstand an injection pressure of molten resin by means of a clamping structure.

Injection molding using the mold body shown in FIG. 11 is carried out in a manner to inject molten resin 5 into the sprue 6 while clamping the first and second templates 2 and 3 together by means of the clamping mechanism to introduce the molten resin through the runner 7 and gate 8 into the cavity 4, resulting in a molded resin product 9 being obtained. The molded resin product 9 thus obtained includes an intended molded article 9a formed due to curing of molten resin filled in the cavity 4, a molded resin portion formed due to curing of molten resin remaining in the gate 8 (hereinafter referred to as "in-the-gate molded resin portion") which is designated at reference numeral 9b, a molded resin portion formed due to curing of resin remaining in the runner 7 (hereinafter referred to as "in-the-runner molded resin portion) which is indicated at 9c, and a molded resin portion formed due to curing of resin remaining in the sprue 6 (hereinafter referred to as "in-the-sprue molded resin portion") which is designated at 9d, which are connected to each other in order.

After injection of the molten resin into the mold body, the second template 3 is displaced to the open position to remove the in-the-sprue molded resin portion 9d from the sprue 6 and release the molded article 9a in the cavity from the cavity formation section 4a of the first template 2. Also, the molded article 9a in the cavity 4 is released from the cavity formation section 4b of the second template 3 by means of an ejector pin (not shown) and concurrently the molded article 9a is separated from the in-the-gate molded resin portion 9b.

Referring now to FIG. 12, an essential part of a mold body of another conventional injection mold is illustrated. The mold body generally designated by reference numeral 1 is so constructed that a first template 2 is provided therein with a runner 7 and a gate 8, which are arranged in a direction perpendicular to a parting line PL. The gate 8 is arranged so as to be orientated to a central position of a portion of a cavity 4 to which the gate 8 is connected, so that molten resin may be injected into the cavity 4 from one of both ends of the cavity opposite to each other in a direction perpendicular to the parting line PL. Such a gate arranged so as to permit resin to be injected into the cavity in the direction perpendicular to the parting line PL is called a pinpoint gate.

Molding using the mold shown in FIG. 12 is carried out in a manner to inject molten resin into the mold body 1 and then concurrently displace the first and second templates 2 and 3 in a downward direction in FIG. 12 while keeping an upper end (not shown) of an in-the-runner molded resin restrained, to thereby apply tensile force between a molded article 9a and an in-the-gate molded resin portion 9b, resulting in the in-the-gate molded resin portion 9b being separated from the molded article 9a and the in-the-runner molded resin portion 9c being removed from the runner 7 of the first template 2. Then, the first template 2 is stopped, so that only the second template 3 is moved in a direction indicated at an arrow in FIG. 12. This results in the molded article 9a being released from a cavity formation section 4a of the first template 2 and removed from a cavity formation section 4b of the second template 3 by means of an ejector pin (not shown).

Injection of resin into the cavity 4 by means of the submarine gate as shown in FIG. 11 permits the molded article 9a and in-the-gate molded resin portion 9b to be readily separated from each other at a boundary therebetween by shearing during release of the molded article 9a from the cavity 4, to thereby permit automatic operation of the injection molding machine to be readily carried out over all steps from injection of resin to release of the molded article.

However, the mold body provided with the submarine gate causes resin fragments to remain near an opening of the gate 8 on a side of the cavity 4, so that clogging of the gate with the resin fragments often occurs when the molded article 9a is separated from the in-the-gate molded resin portion 9b. Such clogging of the gate 8 fails to ensure satisfactory run of molten resin in the next molding operation, leading to a failure in molding such as surface sink or the like. Thus, the mold body provided with the submarine gate causes production of a certain number of defective molded articles, leading to a deterioration in yield of the products.

On the contrary, the mold body provided with the pinpoint gate as shown in FIG. 12 permits separation between the molded article and the in-the-gate molded resin portion during release of the molded article from the cavity to be accomplished by tensile force applied in an axial direction of the gate between the molded article and the in-the-gate molded resin portion rather than by shearing, to thereby effectively prevent clogging of the gate, resulting in a failure in molding such as surface sink or the like due to misrun of molten resin from being substantially prevented.

Unfortunately, the mold body provided with the pinpoint gate causes the in-the-gate molded resin portion 9b to be separated from the molded article 9a in a manner to be torn off from the molded article 9a; so that separation of the in-the-gate molded resin portion 9b from the molded article 9a while keeping resin at a central portion of the gate 8 insufficiently cured causes the uncured resin at the central portion of the gate to remain on a side of the molded article 9a in a threading or roping manner, resulting in the residual resin forming a large protrusion 9a1 on an outer surface of the molded article 9a.

In order to eliminate the disadvantage, the mold body provided with the pinpoint gate employs an approach wherein a cycle of operation of an injection molding machine is set so as to permit the in-the-gate molded resin portion 9b to be separated from the molded article 9a after a period of time for cooling required for sufficiently curing resin at the central portion of the gate elapses, to thereby prevent the protrusion 9a1 increased in size from being formed on the molded article 9a.

However, such setting of operation cycle of the molding machine still causes resin at the central portion of the gate to be insufficiently cured irrespective of a lapse of time, resulting in the protrusion 9a1 increased in size being formed on the molded article 9a during separation of the in-the-gate molded resin portion 9b from the molded article 9a; because pollution of an inner surface of the gate due to repeating of the molding operation deteriorates heat dissipation through the inner surface of the gate, to thereby increase a period of time required for curing resin at the central portion of the gate.

Thus, the conventional mold body provided with the pinpoint gate must be cleaned frequently or at reduced intervals, to thereby cause maintenance of the mold to be required at reduced or frequent intervals, leading to a deterioration in productivity thereof.

SUMMARY OF THE INVENTION

The present invention has been made in view of the foregoing disadvantage of the prior art.

Accordingly, it is an object of the present invention to provide an injection mold which is capable of increasing a yield of the products.

It is another object of the present invention to provide an injection mold which is capable of improving productivity thereof.

It is another object of the present invention to provide an injection mold which is capable of preventing a failure in molding due to clogging of a gate, to thereby increase a yield of the products.

It is a further object of the present invention to provide an injection mold which is capable of significantly increasing intervals of maintenance thereof.

The present invention is applied to an injection mold for molding synthetic resin into molded articles.

In accordance with the present invention, an injection mold is provided. The injection mold includes a mold body constituted by a first template and a second template which are arranged in a manner to be separable from each other. The mold body is provided therein with at least one cavity having a configuration corresponding to that of an object to be molded or an article to be molded, at least one resin flow passage through which molten resin is flowed toward the cavity, and at least one gate arranged between the cavity and the resin flow passage in a manner to be connected at one end thereof to the cavity and at the other end thereof to the resin flow passage. The cavity is in the form of a space which is filled with molten resin to form a molded article. In the present invention, the gate is arranged in a manner to be eccentric in a direction in which it is deviated from the cavity so that only a part of an opening of the gate at an end of the gate is open to the cavity during injection of resin into the cavity.

The construction of the present invention that only a part of the opening of the gate at the end of the gate is open to the cavity permits an overhang projecting from a side surface of a molded article to be formed on an end of resin cured in the gate facing the cavity. Thus, when tensile force is applied between the molded article in the cavity and the resin cured in the gate during release of the molded article from the mold body, concentration of stress occurs at a boundary between the overhang of the resin cured in the gate and the molded article, so that a crack readily occurs at the boundary. This permits the resin in the gate to be readily cut off from the molded article during release of the molded article, to thereby substantially prevent any protrusion from being formed on the molded article released. Also, the resin cured in the gate is ultimately separated, due to growth of the crack, from the molded article at a position in proximity to an inner surface of the gate on which the resin is most rapidly cured. This effectively keeps the resin in the gate from threading during separation of the resin from the molded article, resulting in preventing formation of any large protrusion on the molded article, even when an inner surface of the mold is polluted due to repeating of the molding operation. This permits intervals of maintenance of the mold to be increased to a degree sufficient to improve productivity thereof.

The gate is arranged in the first template in such a manner that one end thereof is open to the second template.

Alternatively, it may be so arranged that the one end is connected to the cavity in the first template.

When the gate is arranged in the first template so as to render the one end open to the second template, the gate is positioned in a manner to be eccentric in a direction deviated from the cavity so that only a part of the opening of the gate at the end of the gate is open to the cavity and the remaining part of the opening is opposite to an end surface of the second template defined along a parting line.

Also, when the gate is so arranged that the one end is connected to the cavity in the first template, the gate is arranged in a manner to be eccentric in a direction in which it is deviated from the cavity so that only a part of an opening of the gate at the end of the gate is open to the cavity and the remaining part of the opening is terminated by an end surface formed at a position in proximity to an end of the cavity facing the gate.

The gate formed in the mold of the present invention may be arranged so as to be positioned in a direction perpendicular to the parting line as in the pinpoint gate formed in the conventional injection mold, however, the present invention is not limited to such arrangement. The gate may be arranged so as to be positioned in a direction slightly inclined from the direction perpendicular to the parting line so long as such arrangement does not interfere with release of resin cured in the gate. Thus, in the present invention, the gate is arranged so as to be positioned in a direction "substantially perpendicular" to the parting line.

In the present invention, the mold body may include still another template in addition to the first and second templates.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1A:
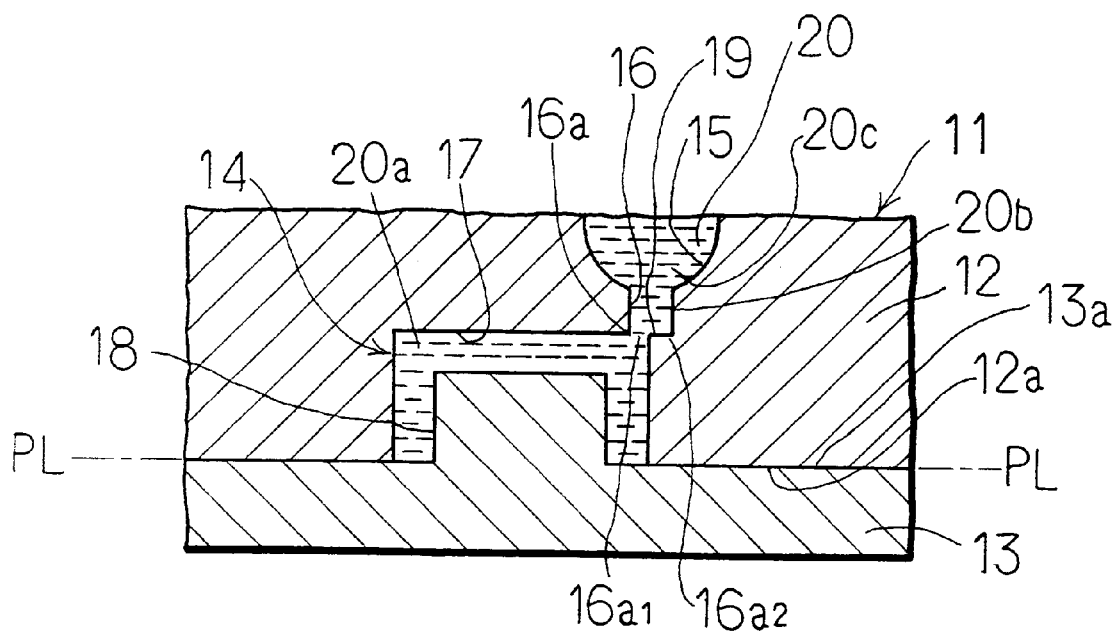
FIG. 1A is a fragmentary sectional view showing a mold body of one type which may be incorporated in an injection mold according to the present invention.

Now, an injection mold according to the present invention will be described hereinafter with reference to FIGS. 1A to 10C, wherein like reference numerals designates like or corresponding parts throughout.

Referring first to each of FIGS. 1A to 2B, a mold body 11 incorporated in an embodiment of an injection mold according to the present invention is illustrated by way of example. The mold body 11 shown in each of FIGS. 1A to 2B includes a first template 12 and a second template 13 adapted to be joined together in a manner to be splittable or separably from each other. The first and second templates 12 and 13 are arranged so as to be displaceable in a direction perpendicular to a parting line PL. Also, the first template 12 and second template 13 are formed with end surfaces 12a and 13a in a manner to be defined along the parting line PL, respectively, which are matched or abutted against each other as shown in each of FIGS. 1A to 2B when molding is to be carried out, resulting in the mold body 11 being closed. The mold body 11 is formed therein with a cavity 14 of a configuration corresponding to that of a molded article, a runner 15 constituting a part of a resin flow passage through which molten resin is flowed toward the cavity 14, and a gate 16 through which molten resin flowed through the runner 15 is injected into the cavity 14. In each of FIGS. 1A to 2B, each one cavity 14, runner 15 and gate 16 are shown. Alternatively or generally, a plurality of cavities 14, runners 15 and gates 16 may be formed in the mold body 11 as desired.

The mold bodies shown in FIGS. 1A to 2B are different from each other in arrangement of the cavity, but are basically identical with each other in arrangement of the gate.

More particularly, in the mold body shown in FIG. 1A, the first template 12 is formed therein with a cavity impression 17 open to the second template 13. The second template 13 is fixedly mounted thereon with a core 18, which is fitted in the cavity impression 17. When the first template 12 and second template 13 are abutted against each other to close the mold body 11, the core 18 is fitted in the cavity impression 17 in a manner to form the cavity 14 between an inner surface of the cavity impression 17 and the core 18. The runner 15 is arranged so as to extend toward the second template 13 in a direction perpendicular to the parting line PL and formed so that a distal end thereof is gradually reduced in an inner diameter toward the cavity 14. The gate 16 is arranged so as to permit the distal end of the runner 15 having a minimum diameter and the cavity 14 to communicate with each other therethrough. In FIG. 1, the cavity 14 is formed at an end thereof connected to the gate 16 or an end thereof facing the first template 12 into an annular shape in contour and the gate 16 is formed into a circular shape in cross section.

Figure 3:
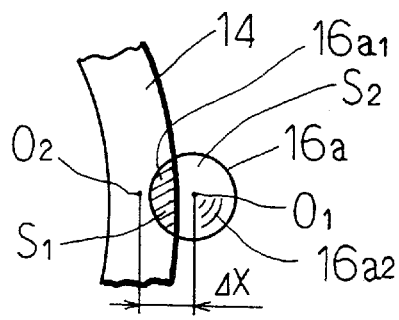
FIG. 3 is a fragmentary schematic view showing positional relationship between an end of a gate facing or on a side of a cavity and the cavity in an injection mold according to the present invention.

In the present invention, the gate 16 is arranged in a manner to be eccentric in a direction deviated from the cavity 14, so that only a part of an opening of the gate 16 defined at one end of the gate facing the cavity 14 is open to the cavity 14 or communicates with the cavity 14. More particularly, in the present invention, the gate 16, as shown in FIG. 3, is so arranged that an opening of the gate 16 at an end 16a of the gate 16 facing the cavity 14 has a central position O1 deviated toward an outer periphery of the cavity 14 by a predetermined distance ΔX from a central position O2 of a portion of the cavity 14 connected to the gate 16, so that only a part 16a1 of the opening at the end 16a of the gate 16 facing the cavity 14 which is indicated at oblique lines in FIG. 3 is rendered open to the cavity 14 and the remaining part 16a2 of the opening at the end 16a faces a suitable surface. The central position O2 is defined to be a position at which the cavity 14 is divided into two in a width direction thereof. In the mold body 11 of FIG. 1A, the end 16a of the gate 16 is formed in such a manner that the remaining part 16a2 of the opening is opposite to an end surface 19 formed at a position adjacent to the end of the cavity 14 facing the gate 16.

Figure 1B:
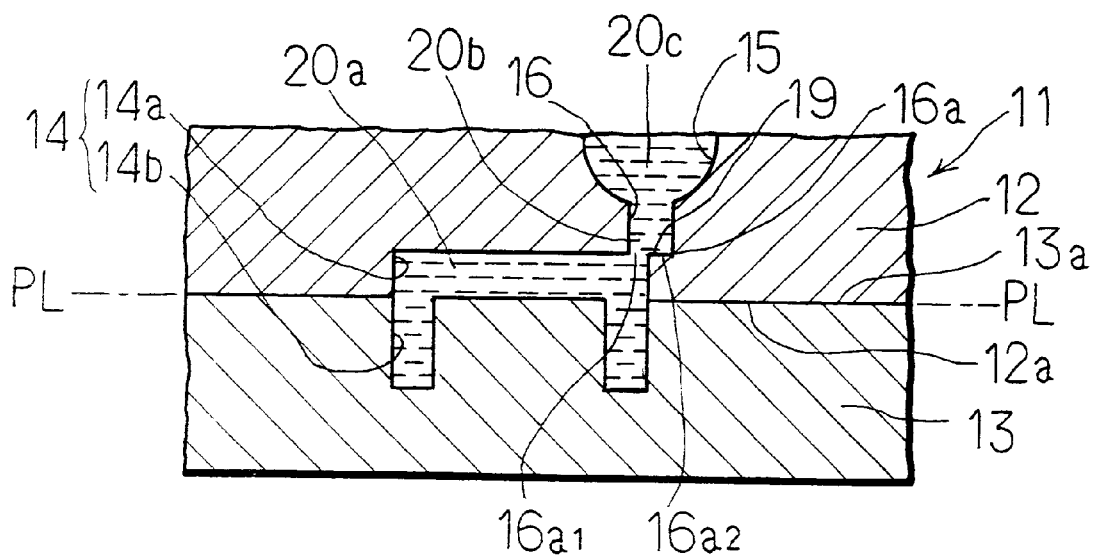
FIG. 1B is a fragmentary sectional view showing a modification of the mold body shown in FIG. 1A.

In the mold body 11 shown in FIG. 1B, the cavity 14 is constituted by a cavity formation section 14a formed in the first template 12 and a cavity formation section 14b formed in the second template 13, to thereby be arranged so as to extend over both first and second templates. The remaining part of the mold body of FIG. 1B may be constructed in substantially the same manner as that shown in FIG. 1A.

Figure 2A:
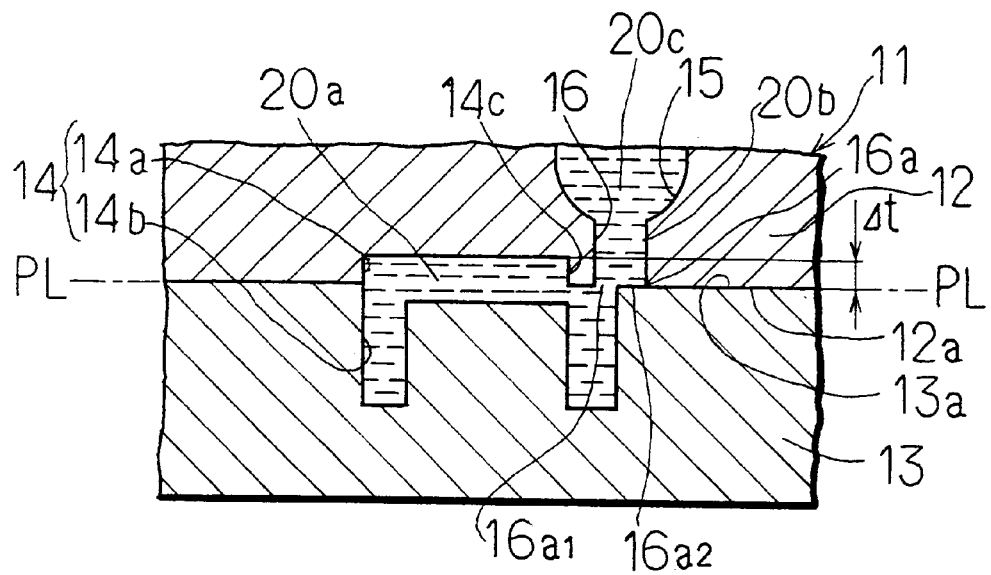
FIG. 2A is a fragmentary sectional view showing a mold body of another type which may be incorporated in an injection mold according to the present invention.

In the mold body 11 shown in FIG. 2A, the cavity 14 is likewise constituted by a cavity formation section 14a formed in the first template 12 and a cavity formation section 14b formed in the second template 13, to thereby be arranged so as to extend over both first and second templates. The cavity 14 is formed at a part of an end thereof facing the first template 12 with a recess 14c of a slight depth ΔX, so that the gate 16 is connected to the cavity 14 at a position corresponding to a bottom of the recess 14c. In the mold body of FIG. 2A, the depth ΔX of the recess 14c is defined to be equal to a depth of the cavity formation section 14a formed in the first template 12, so that the bottom of the recess 14c is flush with the end surface 13a of the second template 13.

The gate 16 is so arranged that the end 16a thereof facing the cavity is open to the second template 13 or the end surface 12a of the first template 12. The gate 16 is formed so as to be eccentric in a direction deviated from the cavity 14; so that when the first template 12 and second template 13 are kept abutted against each other as shown in FIG. 2A, only a part 6a1 of the opening at the end 16a of the gate 16 facing the cavity 14 is open to the cavity 14 and the remaining part 16a2 of the opening is rendered opposite to the end surface 13a of the second template 13 defined along the parting line.

Figure 2B:
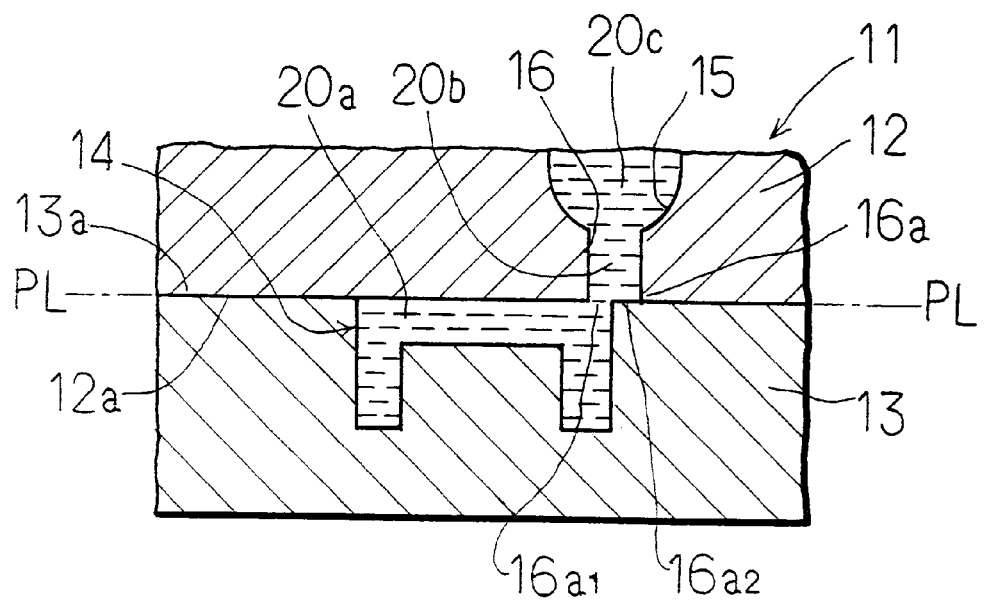
FIG. 2B is a fragmentary sectional view showing a modification of the mold body shown in FIG. 2A.

In the mold body 11 shown in FIG. 2B, the cavity 14 is provided in only the second template 13 in such a manner that the end of the cavity 14 facing the gate 16 is open to the first template 12. The gate 16 is so arranged that the end 16a thereof facing the cavity 14 is open to the second template 13. The gate 16 is formed to be eccentric in the direction deviated from the cavity 14; so that when the first template 12 and second template 13 are kept abutted against each other as shown in FIG. 2B, only the part 16a1 of the opening of the gate 16 at the end of the gate facing the cavity 14 is open to the cavity 14 and the remaining part 16a2 of the opening is rendered opposite to the end surface 13a of the second template 13 arranged along the parting line PL.

In the mold body 11 shown in each of FIGS. 1A to 2B, a sectional area of the part 16a1 of the opening of the gate 16 at the end 16a of the gate 16 facing the cavity 14 which is open to the cavity 14 or an area indicated by oblique lines in FIG. 3 acts as an available sectional area S1 of the opening of the gate and a sectional area of the remaining part 16a2 of the opening at the end of the gate defines an unavailable sectional area S2. In the present invention, the available sectional area S1 is set to be a size required to fully fill molten resin in the cavity 14 and a ratio S1/S2 between the available sectional area S1 and the unavailable sectional area S2 is set to be a value required to separate a molded article from resin cured in the gate without causing the resin in the gate to remain on a side of the molded article. In order to permit the molded article to be separated from the resin in the gate while substantially preventing the resin in the gate from remaining on the side of the molded article, the ratio S1/S2 is desirably decreased, so that a central area in the gate in which curing of resin is delayed due to a deterioration in heat dissipation through the inner surface of the gate owing to an increase in pollution of the mold is kept from being open to or communicating with the cavity.

Injection molding using each of the injection molds described above may be carried out by injecting molten resin from a sprue (not shown) through the runner 15 and gate 16 into the cavity 14 to form a molded resin product 20 while keeping the first template 12 and second template 13 abutted against each other as shown in each of FIGS. 1A to 2B. The molded resin product 20 includes a molded article 20a formed in the cavity 14, an in-the-gate molded resin portion 20b formed in the gate 16, an in-the-runner molded resin portion 20c formed in the runner 16 and an in-the-sprue molded resin portion formed in the sprue (not shown) which are integrally connected to each other.

After injection of resin into the cavity 14, the first template 12 and second template 13 are concurrently moved in a direction perpendicular to the parting line PL and opposite to the sprue while holding the in-the-runner molded resin portion 20c immovable, to thereby permit tensile force to be applied between the molded article 20a and the in-the-gate molded resin portion 20b, resulting in the in-the-gate molded resin portion 20b being separated or cut off from the molded article 20a. Then, the first template 12 and second template 13 are further displaced to release the in-the-gate molded resin portion 20b and in-the-runner molded resin portion 20c from the first template 12. Thereafter, the second template 13 is displaced relative to the first template 12 in a direction in which it is separated from the first template 12, to thereby release the molded article 20a from the first template 12, followed by removal of the molded article 20a from the second template 13 by means of an ejector pin (not shown).

Figure 4A:
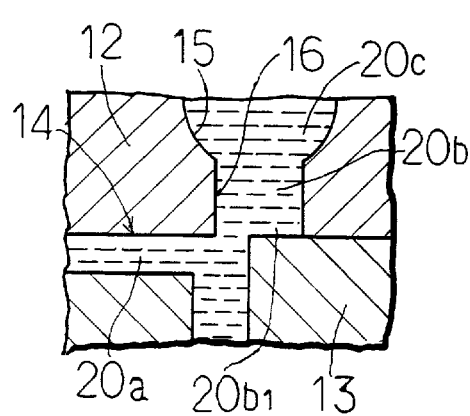
FIGS. 4A to 4D each are a fragmentary schematic sectional view showing a step of separating resin cured in a gate of an injection mold according to the present invention from a molded article.
Figure 4B:
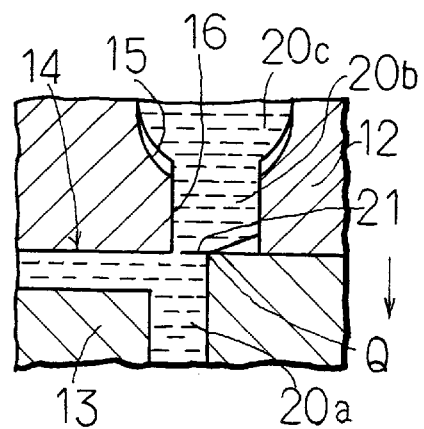
Figure 4C:
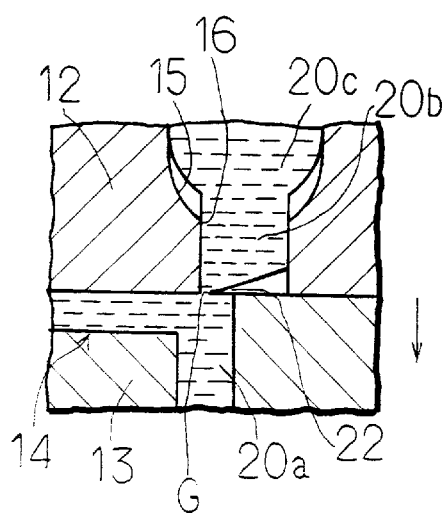
Figure 4D:
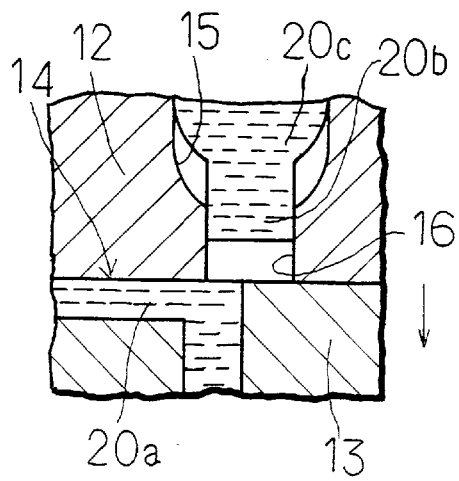

The above-described construction wherein the gate 16 is eccentric in a direction deviated from the cavity 14 to permit only the part 16a1 of the opening of the gate 16 at the end 16a of the gate facing the cavity 14 to be open to the cavity or communicate with the cavity causes an overhang 20b1 to be formed on an end of the in-the-gate molded resin portion 20b facing the cavity 14 or on a side of the cavity in a manner to protrude from a side surface of the molded article 20a as shown in FIG. 4A. Therefore, when tensile force is applied between the molded article 20a in the cavity and the in-the-gate molded resin portion 20b as shown in FIG. 4B, concentration of stress occurs at a boundary Q between the overhang 20b1 of the in-the-gate molded resin portion 20b and the molded article 20a. Such concentration of stress at the boundary Q facilitates formation of a crack 21 at the boundary. Then, the crack 21 readily grows into a slit 22 as shown in FIG. 4C, so that the in-the-gate molded resin portion 20b may be smoothly cut off from the molded article 20a as shown in FIG. 4D.

The in-the-gate molded resin portion 20b is ultimately cut off from the molded article 20a at a position G (FIG. 4C) in proximity to the inner surface of the gate 16 due to growth of the crack 21 into the slit 22. At the position G in proximity to the inner surface of the gate 16, resin is rapidly cured due to heat dissipation from the inner surface of the gate. Thus, the above-described construction which permits the in-the-gate molded resin portion 20b to be ultimately cut off from the molded article at the position G in the vicinity of the inner surface of the gate 16 keeps resin from threading during separation of the in-the-gate molded resin portion 20b from the molded article 20a, to thereby prevent any protrusion increased in size from being formed on the molded article 20a, even when an increase in pollution of the mold causes dissipation of heat from the inner surface of the gate to be deteriorated to a degree. This permits intervals of maintenance of the mold to be substantially increased, to thereby improve productivity of the mold as compared with the prior art.

In the mold body shown in each of FIGS. 1A to 2B, a decrease in ratio S1/S2 between the available sectional area S1 of the opening of the gate 16 and the unavailable sectional area S2 thereof facilitates separation of the in-the-gate molded resin portion 20b from the molded article 20a and permits a protrusion formed on the molded article 20a to be decreased in size. In general, S1/S2 is preferably set to be below ½ (S1/S2 üâ ½) to keep the central portion of the end of the gate facing the cavity which causes curing of the resin to be most delayed from being open to the cavity. A reduction in S1/S2 means that the available sectional area S1 contributing to injection of resin into the cavity 14 is reduced relative to the unavailable sectional area S2. A size in available sectional area S1 required may be ensured by increasing a sectional area S (=S1+S2) of the gate 16. In this regard, an excessive increase in sectional area S of the gate 16 leads to waste of resin, therefore, a size of the sectional area S of the gate and a magnitude of deviation or eccentricity of the end of the gate facing the cavity 14 are desirably set so as to decrease the ratio S1/S2 as much as possible while keeping the sectional area S of the gate 16 from being excessively increased.

As described above, the mold body shown in each of FIGS. 1A to 2B is so constructed that the first template 12 and second template 13 are concurrently moved while keeping the in-the-runner molded resin portion 20c immovable, to thereby permit tensile force to be applied between the molded article 20a and the in-the-gate molded resin portion 20b during release of the molded article from the mold. Alternatively, application of tensile force therebetween may be accomplished in a different manner. For example, the second template 13 may be displaced together with the molded article in a direction of separation thereof from the first template 12 while holding the molded article in the cavity by means of an ejector pin inserted through the first template 12, to thereby permit tensile force to act between the molded article and the in-the-gate molded resin portion, resulting in the molded article 20a being cut off from the in-the-gate molded resin portion 20b.

Also, in each of the mold bodies 11 described above, as shown in FIG. 3, the gate 16 is positioned in a manner to be deviated toward an outer periphery of the cavity 14, so that only the part 16a1 of the opening of the gate 16 at the end 16a of the gate facing the cavity 14 may be open to the cavity. However, the present invention merely requires to render only a part of the opening of the gate 16 at the end 16a of the gate facing the cavity 14 to be open to the cavity, therefore, deviation or eccentricity of the gate from the cavity is not limited to the above-described manner. For example, the mold body 11 may be so constructed that the gate 16 may be positioned in a manner to be deviated toward an inner periphery of the cavity 14 in FIG. 3, resulting in only a part of the opening of the gate 16 at the end 16a of the gate facing the cavity 14 being rendered open to the cavity 14.

Now, an embodiment of an injection mold according to the present invention will be described hereinafter with reference to FIGS. 5 to 10.

Figure 10A:
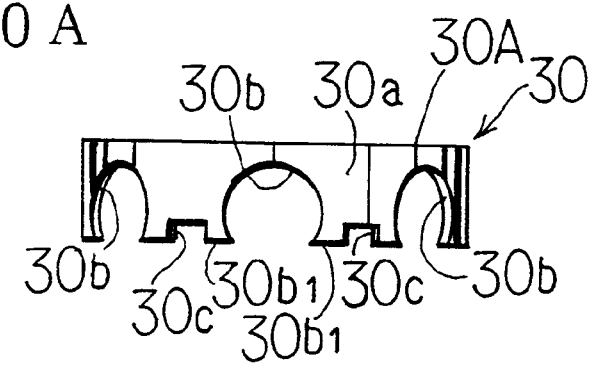
FIGS. 10A to 10C are a plan view, a front elevation view and a left side elevation view showing an appearance of a holder of a ball bearing molded by an embodiment of an injection mold according to the present invention, respectively.
Figure 10B:
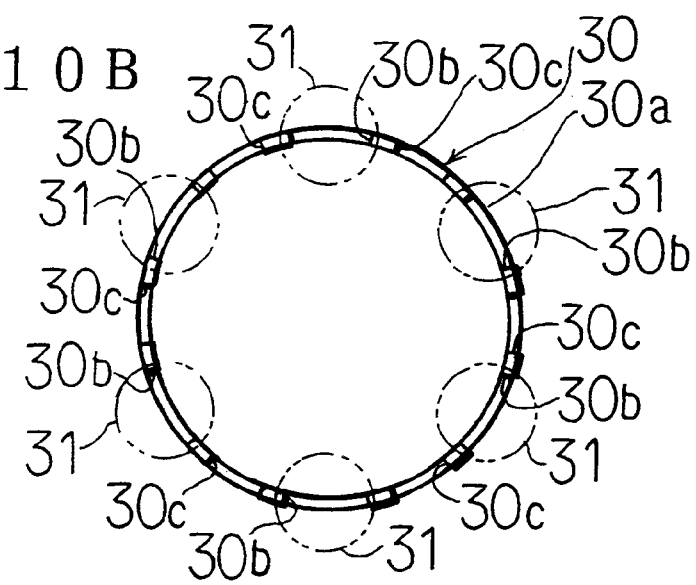
Figure 10C:
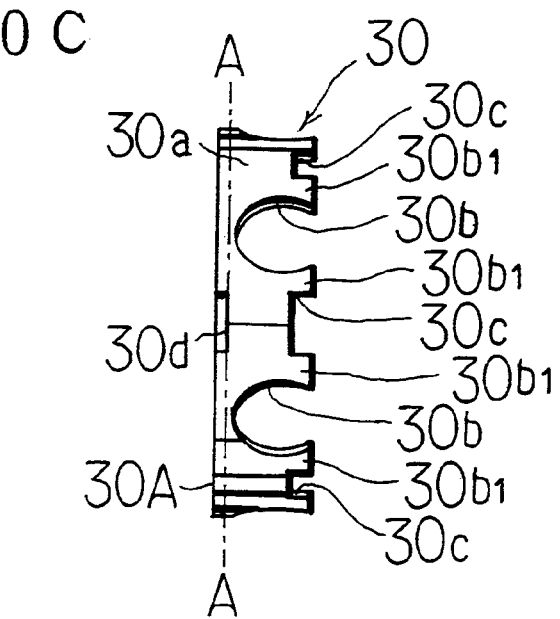
Figure 11:
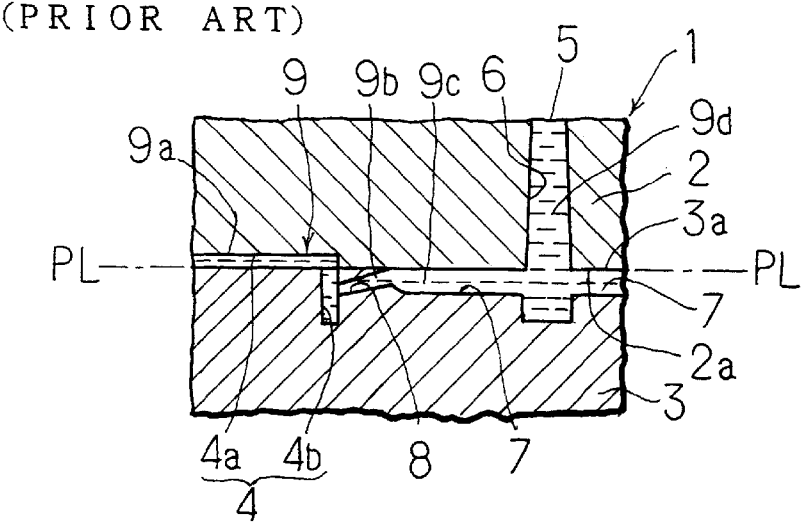
FIG. 11 is a fragmentary sectional view showing an essential part of a mold body of a conventional injection mold which has been generally used in the art.
Figure 12:
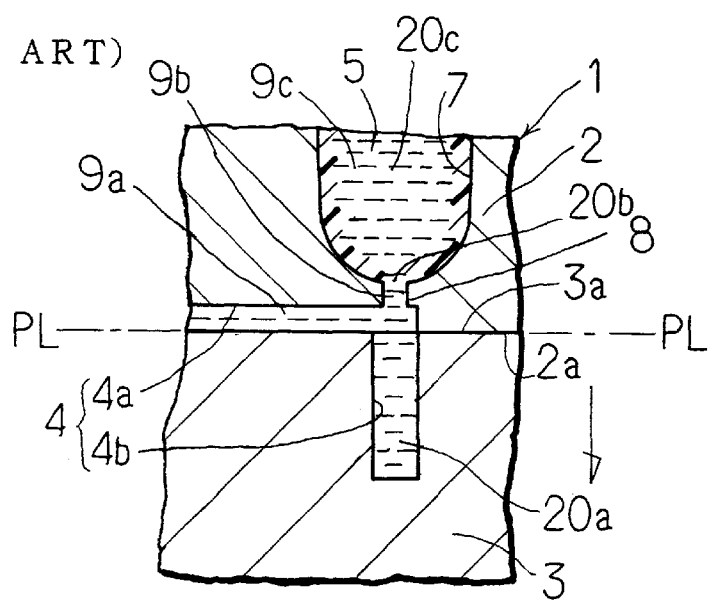
FIG. 12 is a fragmentary sectional view showing an essential part of a conventional injection mold provided with a pinpoint gate.
Figure 13:
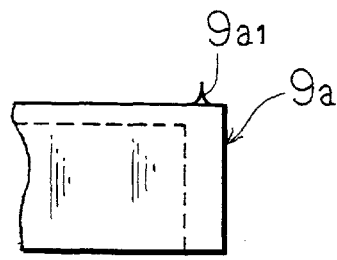
FIG. 13 is a fragmentary front elevation view showing an appearance of an essential part of a molded article manufactured by the injection mold shown in FIG. 12.

An injection mold of the illustrated embodiment is adapted for injection molding of a holder for a ball bearing. Referring first to FIGS. 10A to 10C, a holder 30 for a ball bearing injection-molded by the illustrated embodiment is illustrated. The holder 30 is constructed into a ring-like structure including a peripheral wall 30a, wherein the peripheral wall 30a is provided with a plurality of ball holding sections 30b of a C-shape which are arranged so as to penetrate the peripheral wall 30b in a thickness direction thereof and be open to one side of the peripheral wall in an axial direction thereof. Also, the ball holding sections 30b are arranged in a manner to be spaced from each other at predetermined intervals along a circumferential direction thereof. Also, in order to facilitate release of the molded holder 30 from the mold, a cutout 30c is formed between each adjacent two ball holding sections 30b. Such arrangement of the cutouts 30c permits both side portions 30b1 of each of the ball holding sections 30b to be subject to elastic deformation when the holder molded is released from a core section in a cavity, so that the release may be facilitated. The holder 30 is formed at a part of one end thereof in an axial direction thereof opposite to the other end thereof in the axial direction to which the ball holding section 30b is open with a recess 30d of a reduced depth, so that the cavity is connected to a gate at a position corresponding to a bottom of the recess 30d.

The holder 30 is arranged between an outer ring of the ball bearing and an inner ring thereof to rotatably hold a ball 31 of the bearing inside each of the ball holding sections 30b.

The holder 30 is required to be formed with high dimensional accuracy; thus, when resin in the gate remains on the holder 30 molded, to thereby form a noticeable protrusion thereon, any after-processing is required for removing the protrusion. The mold of the illustrated embodiment prevents any large protrusion to be removed by after-processing from being formed on an outer surface of the molded article or holder 30. Nevertheless, for insurance purposes, the illustrated embodiment is so constructed that the molded article 30 is formed at a part thereof with a recess 30d, in which a connection between resin in the gate of the injection mold and the molded article is positioned. Such construction, even when resin in the gate of the mold remains on the holder to form any protrusion thereon, prevents the protrusion from projecting from an end of the holder defined in an axial direction thereof, to thereby keep the protrusion from adversely affecting performance of the holder.

Figure 5:
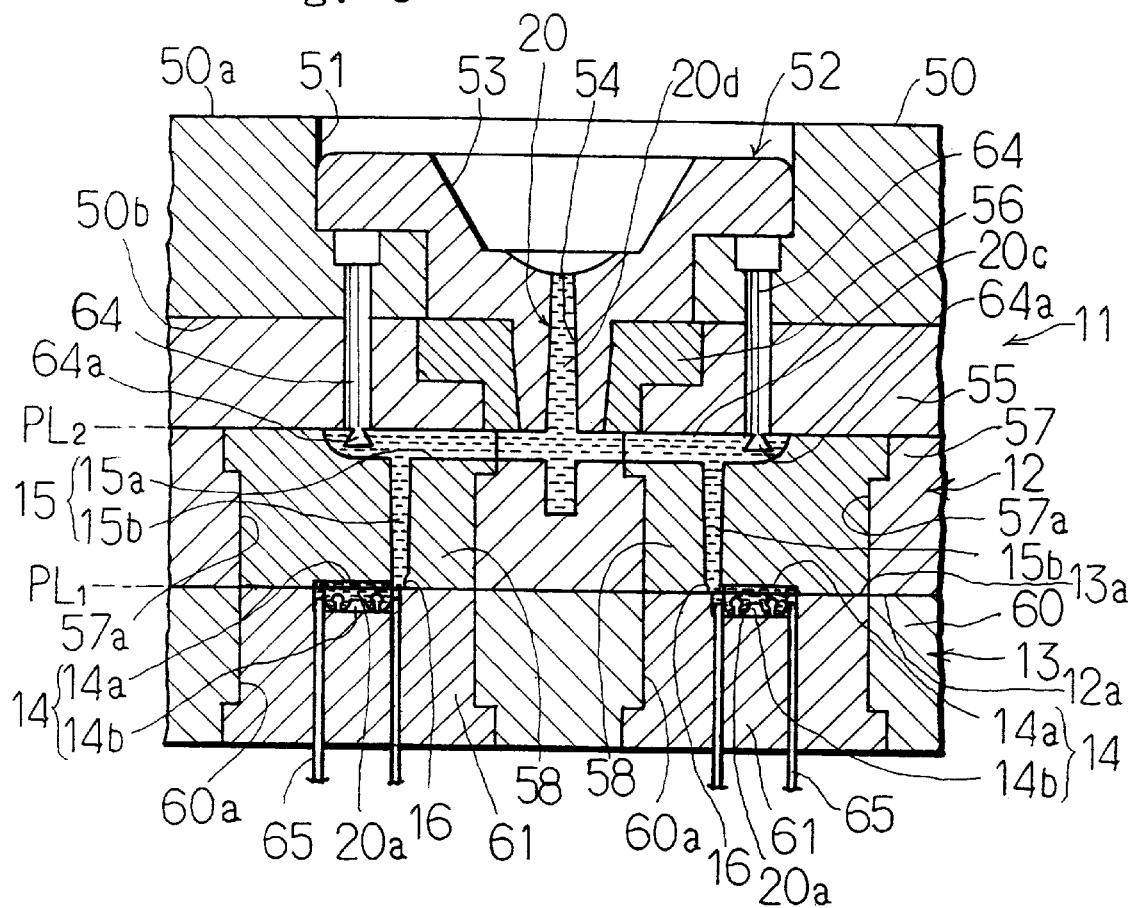
FIG. 5 is a fragmentary vertical sectional view showing an essential part of an embodiment of an injection mold according to the present invention.
Figure 7:
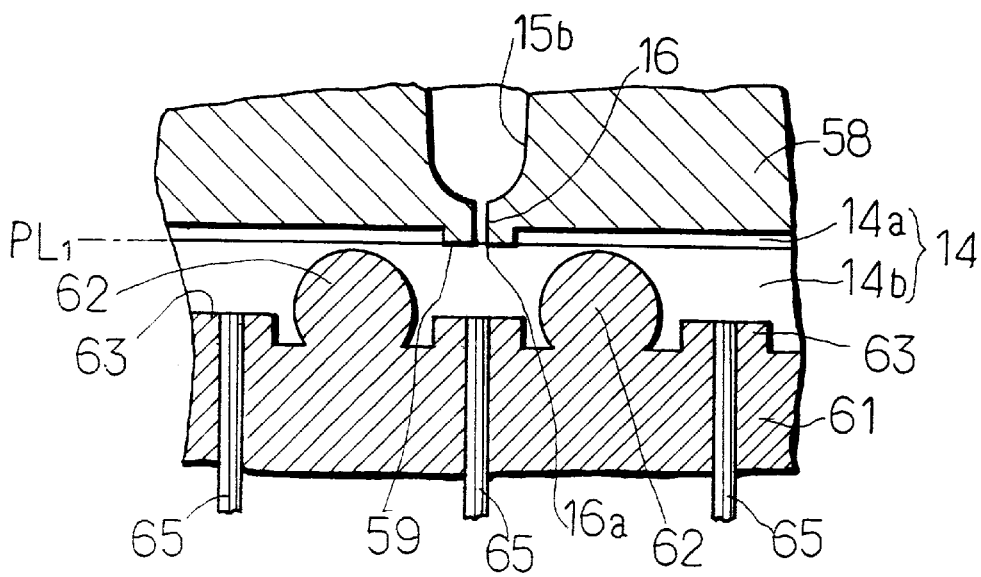
FIG. 7 is a vertical sectional view showing a structure around both a cavity and a gate of each of first and second templates in an embodiment of an injection mold according to the present invention.
Figure 6:
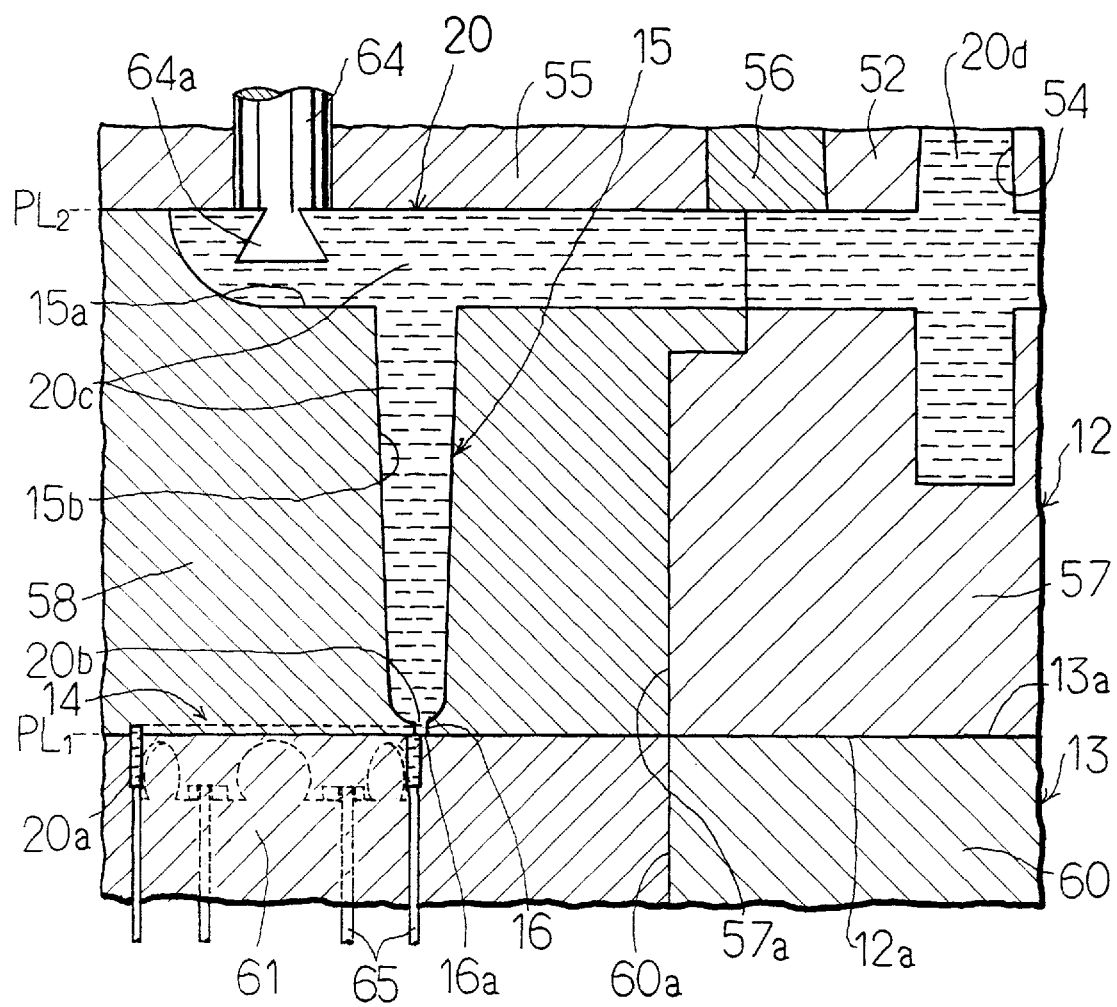
FIG. 6 is a fragmentary enlarged sectional view showing an essential part of the injection mold shown in FIG. 5.
Figure 8:
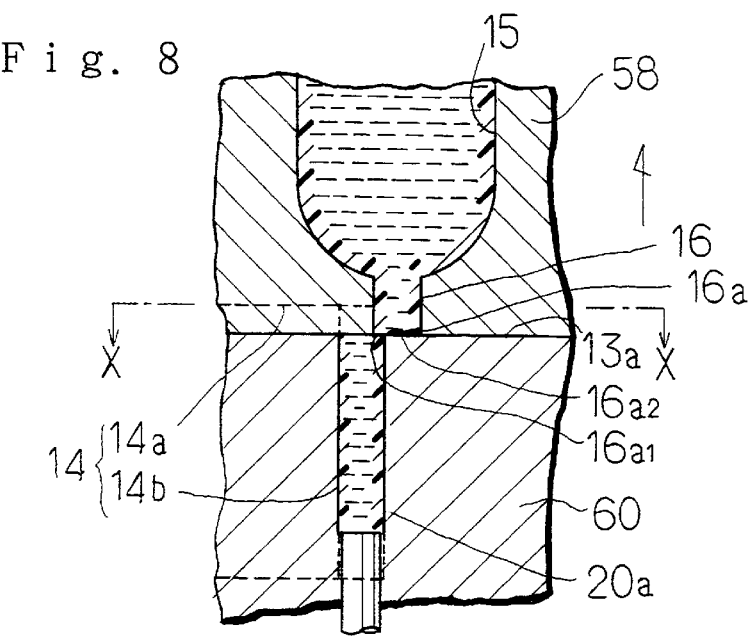
FIG. 8 is a fragmentary enlarged vertical sectional view showing a structure around a cavity and a gate of first and second templates in an embodiment of an injection mold according to the present invention.
Figure 9:
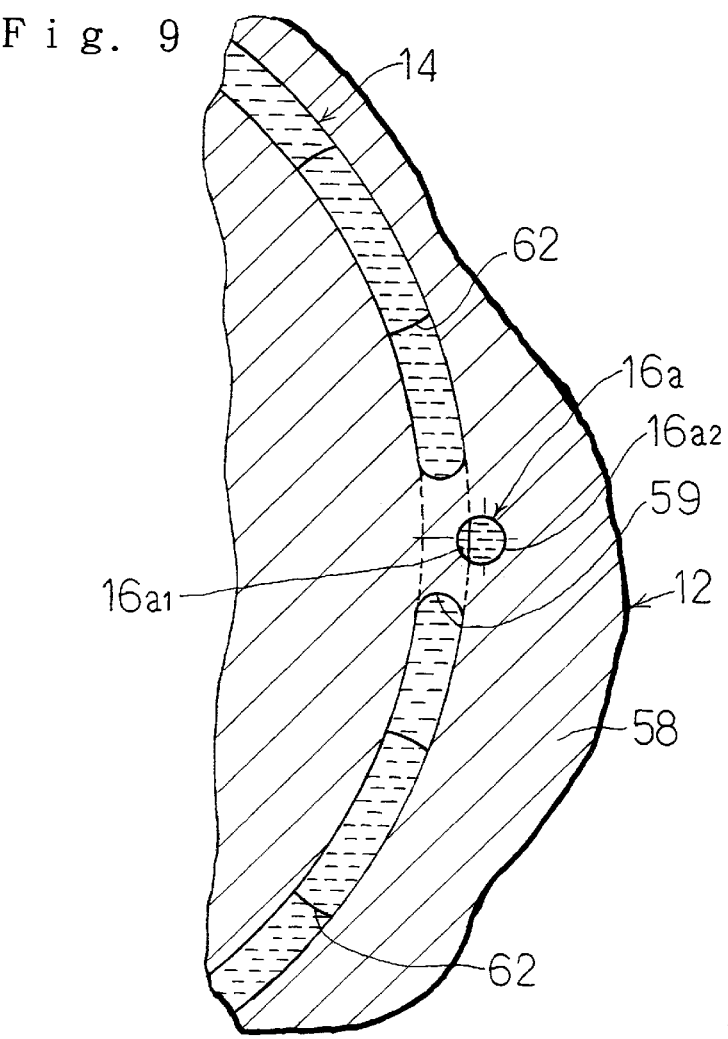
FIG. 9 is a sectional view taken along line X—X of FIG. 8.

For the purpose of injection molding of the holder 30, the injection mold of the illustrated embodiment is constructed in such a manner as shown in FIGS. 5 to 9, wherein FIG. 5 is a vertical sectional view showing an essential part of the mold, FIG. 6 is an enlarged sectional view showing the essential part in an enlarged scale, FIG. 7 is a vertical sectional development view showing a structure around both a cavity and a gate of each of first and second templates of the mold, FIG. 8 is an enlarged vertical sectional view showing a structure around both cavity and gate of each of the first and second templates of the mold, and FIG. 9 is a sectional view taken along line X—X of FIG. 8.

In FIG. 5, reference numeral 50 designates a stationary plate fixed on a frame of an injection molding machine (not shown). The stationary plate 50 is formed at a central portion thereof with a mounting hole 51, in which a sprue bushing 52 is mounted. The sprue bushing 52 has an injection nozzle insertion port 53 formed so as to be open on one end surface 50a of the stationary plate 50 defined in a thickness direction thereof or on one side thereof defined in an axial direction of the molding machine, as well as a sprue 54 formed so as to open at one end thereof to the injection nozzle insertion hole 53 and at the other end thereof to a distal end of the sprue bushing 52.

Also, the injection mold of the illustrated embodiment as shown in FIGS. 5 and 6, includes a first template 12 and a second template 13 arranged downwardly of the other end surface 50b of the stationary plate 50 in a manner to be superposed on each other while keeping the first template 12 facing the stationary plate 50, as well as a third template 55 interposedly arranged between the first template 12 and the stationary plate 50. In the illustrated embodiment, the first template 12, second template 13 and third template 55 cooperate with each other to constitute a mold body 11.

In FIGS. 5 and 6, reference character PL1 designates a parting line between the first template 12 and the second template 13 and PL2 is a parting line between the first template 12 and the third template 55. The third template 55, as shown in FIG. 5, is provided at a central portion thereof with a hole, in which a bushing 56 is mounted. The sprue bushing 52 is fitted at a distal end thereof in the bushing 56. The sprue bushing 52 and bushing 56 are formed into dimensions which permit a distal end surface of each of the bushings 52 and 56 to be positioned on the same plane as an end surface of the third template 55 facing the parting line PL2 while keeping the third template 55 abutted against the other end surface 50b of the stationary plate 50 and keeping the distal end of the sprue bushing 52 in the bushing 56 as shown in FIG. 5.

The first template 12 is constituted by a die holding plate 57 formed at positions thereof symmetric with each other about a central axis of the sprue 54 with a pair of die mounting holes 57a and dies 58 each fixed in each of the die mounting holes 57a. The first template 12 is formed with a lateral groove 15a in a manner to extend over the die holding plate 57 and dies 58 along the parting line PL2. The lateral groove 15a is arranged so as to communicate at a central portion thereof with the sprue 54 when the first template 12 and third template 55 are kept abutted against each other. The dies 58 each are formed therein with a vertical hole 15b, a cavity formation section 14a constituting a part of a cavity 14, and a gate 16. The vertical hole 15b of each of the dies 58 is arranged so as to communicate at one end thereof with the lateral groove 15a and at the other end thereof with the gate 16, so that the lateral groove 15a and each of the vertical holes 15b cooperate with each other to constitute a runner 15 through which molten resin fed through the sprue 54 is flowed toward the cavity 14 of each of the dies 58.

The cavity formation section 14a acts to mold a portion of the holder 30 of FIG. 10 between the end surface 30A of the holder 30 facing the recess 30d in the axial direction thereof and a position thereof corresponding to the bottom of the recess 30d or a portion of FIG. 10C on a left-hand side of a line A—A thereof. For this purpose, it is formed into a shape obtained by dividing a part of the annular groove by a male die section 59 (FIG. 7) for forming the recess 30d of the holder 30. The gate 16, as shown in FIGS. 6 and 7, is arranged so as to penetrate a central portion of the male die section 59 and be open at the end 16a thereof facing the cavity 14 to the second template 13.

The second template 13 is constituted by a die holding plate 60 formed with die mounting holes 60a in a manner to positionally correspond to the die mounting holes 57a of the die holding plate 57 and dies 61 each mounted in each of the die mounting holes 60a. The dies 61 each are provided with a cavity formation section 14b which forms the cavity 14 in cooperation with the cavity formation section 14a of the first template 12. The cavity formation section 14b acts to mold a portion of the holder 30 shown on a right-hand side of the line A—A of FIG. 10C. The cavity formation section 14b, as shown in FIG. 7, is formed therein with male die sections 62 and 63 for molding ball holding sections 30b and cutouts 30c, respectively.

The gates 16, as shown in FIGS. 8 and 9, each have an end 16a facing the cavity 14 corresponding thereto, which end 16a is arranged in a manner to be eccentric in a direction deviated from the cavity 14, resulting in only a part 16a1 of an opening of the end 16a of the gate 16 facing the cavity 14 being open to the cavity and the remaining part 16a2 of the opening being opposite to an end surface 13a of the second template 13 defined along the parting line PL1, when the first template 12 and second template 13 are kept abutted against each other as shown in FIGS. 8 and 9.

Also, the injection mold of the illustrated embodiment, as shown in FIGS. 5 and 6, includes pins 64 at positions corresponding to both ends of the lateral groove 15a acting as a part of the runner 15. The pins 64 are arranged so as to extend in the axial direction of the injection molding machine and fixed at one end thereof on the stationary plate 50 in such a manner that a portion of each of the pins 64 projecting from the stationary plate 50 is loosely fitted in each of holes formed in the third template 55. The pins 64 each are formed at a distal end thereof with a holding portion 64a of a conical shape. The holding portion 64a of each of the pins 64 is arranged so as to project into the lateral groove 15a when the third template 55 is kept abutted against the stationary plate 50. The pins 64 each function to hold a molded resin portion formed in each of the runners 15, when a molded article formed in each of the cavities 14 is to be separated from resin in each of the gates 16.

The dies 61 arranged in the second template 13 each are provided with an ejector pin 65 for removing the molded article in each of the cavities 14 therefrom.

The third template 55 and the first and second templates 12 and 13 are arranged so as to movable in the axial direction of the injection molding machine and subject to control at a predetermined sequence so as to be actuated by a pneumatic cylinder or the like to carry out a molding operation which will be detailedly described hereinafter.

The injection molding machine may be so arranged that an axis thereof is orientated in either a vertical direction or a horizontal direction. In order to facilitate release of a molded article, the molding machine is preferably arranged while keeping the axis orientated in the horizontal direction.

Now, the manner of molding executed using the injection mold of the illustrated embodiment will be described hereinafter.

First, as shown in FIG. 5, the stationary plate 50 and third template 55, the third template 55 and first template 12, the first template 12 and second template 13 are abutted against each other, respectively, followed by mutual clamping between the templates by means of a clamping mechanism (not shown). Then, an injection nozzle (not shown) is forwardly moved, to thereby be inserted into the injection nozzle insertion hole 53 of the sprue bushing 52. Then, the nozzle is forced at a distal end thereof against an entrance of the sprue 54 to inject molten resin into the sprue 54. This permits the molten resin to be injected into each of the cavities 14 through the sprue 54, each of the runners 15 and each of the gates 16. Subsequently, the resin is left to stand for curing under a pressure of a predetermined level until each of the gates 16 is closed due to curing of the resin. After curing of the resin, the first template 12 and second template 13 are concurrently moved in a direction in which they are separated from the third template 55. At this time, resin cured in the lateral groove 15a of the runners 15 is kept surrounding the distal holding section 64a of each of the pins 64, so that an in-the-runner molded resin portion 20c formed by curing of resin in each of the runners 15 is restrained by the pins 64. Thus, the above-described concurrent movement of the first and second templates 12 and 13 in the direction apart from the third template 55 permits an in-the-gate molded resin portion 20b formed by curing of resin in each of the gates 16 to be separated from a molded article 20a formed in each of the cavities 14, resulting in the molded article 20a being released from each of the cavity formation sections 14a. Separation of the in-the-gate molded resin portion 20b from the molded article 20a is carried out as described above with reference to FIGS. 4A to 4D.

After separation of the in-the-gate molded resin portion 20b from the molded article 20a, the first and second templates 12 and 13 are further moved to remove the in-the-runner molded resin portion 20c from the runner 15 of the first template 12. Then, the third template 55 is transferred in a direction apart from the stationary plate 50, resulting in an in-the sprue molded resin portion 20d formed due to curing of resin in the sprue 54 being removed from the sprue 54, so that moldings constituted by the in-the-sprue molded resin portion 20d, in-the-runner molded resin portion 20c and in-the-gate molded resin portion 20b which are connected to each other are removed from the mold. Further, the ejector pins 65 each are displaced toward the first template 12 to remove the molded article 20a from the cavity formation section 14b.

The inventors made an experiment for molding vinyl chloride resin into the holder 30 of the ball bearing shown in FIG. 10 using the injection mold of the illustrated embodiment. As a result, it was found that any protrusion requiring after-processing is not formed at a connection of the molded article 20a to the in-the-gate molded resin portion 20b. Also, it was confirmed that the mold of the illustrated embodiment permits intervals of maintenance thereof required for ensuring to provide a satisfactory molded article free from any protrusion on an outer surface thereof to be substantially increased as compared with the prior art. Further, it was found that the injection mold of the illustrated embodiment prevents clogging of the gate after release of the molded article and eliminates a failure in molding due to insufficient filling of resin or misrun thereof, so long as the available sectional area S1 which is an area of the part 16a1 of the opening of the gate 16 at the end of the gate facing the cavity 14 which is open to the cavity is substantially increased.

The embodiment shown in FIGS. 5 to 9 is constructed into a two-cavity mold structure. However, the present invention may be constructed into a structure which permits any desired number of molded articles to be concurrently formed. For example, the embodiment of FIGS. 5 to 9 may be constructed into a one-cavity mold structure. Alternatively, it may be constructed so as to form two more cavities in juxtaposition to each other in a direction perpendicular to the plane of FIG. 5 and correspondingly provide additional runners and gates for connecting the cavities to the sprue 54, resulting in being a four-cavity mold structure.

As can be seen from the foregoing, the injection mold of the present invention is so constructed that only a part of the opening of the gate at the end of the gate facing the cavity is open to the cavity, to thereby permit the in-the-gate molded resin portion to be cut off from the molded article at a position in proximity to the inner surface of the gate. Such construction substantially prevents the molded article released from the mold from being formed thereon with a large protrusion even when pollution of the mold is increased due to repeating of the molding operation, resulting in intervals of maintenance of the mold to be significantly increased as compared with the prior art. Also, in the present invention, the gate is arranged so as to permit resin to be injected into the cavity in a direction substantially perpendicular to the parting line, to thereby prevent a failure in molding due to misrun of resin while preventing clogging of the gate as encountered with the submarine gate. Thus, it will be noted that the injection mold of the present invention not only increases a yield of the products, but increases intervals of maintenance thereof as compared with the prior art to improve productivity thereof.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An injection mold comprising:

a mold body including a first template and a second template which are arranged in a manner to be separable from each other;

said mold body being provided therein with at least one cavity, at least one resin flow passage through which molten resin is flowed toward said cavity, and at least one gate arranged so as to extend between said cavity and said resin flow passage in a direction substantially perpendicular to a parting line between said first template and second template and connected at one end thereof to said cavity and at the other end thereof to said resin flow passage;

said gate being arranged in said first template in a manner to be open at one end thereof to said second template;

said gate being arranged in a manner to be eccentric in a direction in which it is deviated from said cavity so that when said first and second templates are kept abutted against each other, only a part of said one end of said gate is open to said cavity and the remaining part of said one end is opposite to an end surface of said second template defined along said parting line.

2. An injection mold as defined in claim 1, wherein said part of said one end has a sectional area S1 and said remaining part thereof has a sectional area S2, said sectional areas S1 and S2 being so defined that a ratio S1/S2 between said sectional areas S1 and S2 is less than ½.

3. An injection mold comprising:

a mold body including a first template and a second template which are arranged in a manner to be separable from each other;

said mold body being provided therein with at least one cavity, at least one resin flow passage through which molten resin is flowed toward said cavity, and at least one gate arranged so as to extend between said cavity and said resin flow passage in a direction substantially perpendicular to a parting line between said first template and said second template and connected at one end thereof to said cavity and at the other end thereof to said resin flow passage;

said gate being arranged in a manner to be eccentric in a direction in which it is deviated from said cavity so that only a part of said one end of said gate is open to said cavity;

the remaining part of said one end being terminated by an end surface formed at a position in proximity to an end of said cavity facing said gate.

4. An injection mold as defined in claim 2, wherein said part of said one end has a sectional area S1 and said remaining part thereof has a sectional area S2, said sectional areas S1 and S2 being so defined that a ratio S1/S2 between said sectional areas S1 and S2 is less than ½.

* * * * *